(12) United States Patent
Selvaraj (10) Patent No.: US 11,459,111 B2
(45) Date of Patent: Oct. 4, 2022

(54) DEICING BOOT UTILIZING ELECTROMAGNETISM AND MAGNETIC FOR BOOT INFLATION

(71) Applicant: Goodrich Corporation, Charlotte, NC (US)

(72) Inventor: Sugumaran Selvaraj, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 1042 days.

(21) Appl. No.: 16/145,355

(22) Filed: Sep. 28, 2018

(65) Prior Publication Data
US 2020/0039655 A1 Feb. 6, 2020

(30) Foreign Application Priority Data
Aug. 3, 2018 (IN) .............................. 201811029311

(51) Int. Cl.
B64D 15/16 (2006.01)
(52) U.S. Cl.
CPC ........... B64D 15/166 (2013.01); B64D 15/16 (2013.01)
(58) Field of Classification Search
CPC ...... B64C 15/16; B64C 15/163; B64C 15/166
See application file for complete search history.

(56) References Cited

U.S. PATENT DOCUMENTS

| 2,327,034 | A | 8/1943 | Geer |
| 4,779,823 | A | 10/1988 | Ely et al. |
| 5,164,242 | A | 11/1992 | Webster et al. |
| 5,904,322 | A | 5/1999 | Giamati et al. |
| 2016/0311542 | A1 | 10/2016 | Mackin |

FOREIGN PATENT DOCUMENTS

EP 3258740 A1 12/2017

OTHER PUBLICATIONS

European Search Report for Application No. 19189201.7, dated Sep. 27, 2019, 8 pages.

*Primary Examiner* — Nicholas McFall
(74) *Attorney, Agent, or Firm* — Cantor Colburn LLP (57) ABSTRACT

An aircraft flight surface deicing system includes an electromagnetic field generator and a deicing boot configured for attachment to an aircraft flight surface. The boot includes: one or more inflation regions including a first inflation region; one or more magnetic fluid reservoirs in fluid communication with the first inflation region, the one or more fluid reservoirs including a first fluid reservoir; a magnetic fluid contained in a combination of the first inflation regions and the one or more magnetic fluid reservoirs. In a first state, the magnetic fluid is contained in the first fluid reservoir and, in a deicing state, the electromagnetic field generator generates one or more fields that cause the magnetic fluid to exit the first fluid reservoir and travels along a length of the inflation region.

18 Claims, 6 Drawing Sheets

DEICING BOOT UTILIZING ELECTROMAGNETISM AND MAGNETIC FOR BOOT INFLATION

FOREIGN PRIORITY

This application claims priority to Indian Patent Application No. 201811029311 filed Aug. 3, 2018, the entire contents of which is incorporated herein by reference.

BACKGROUND

Exemplary embodiments pertain to the art of deicing boots and, in particular, to a deicing boot utilizing electromagnetism and magnetic to boot inflation.

Accumulation of ice on aircraft wings and other aircraft structures during flight is a known issue. A variety of techniques have been used to remove ice from aircraft during flight including chemical deicing (applying chemicals to aircraft structures to reduce ice adhesion forces or reduce the freezing point of water that collects on the aircraft), thermal deicing (actively heating aircraft structures to prevent ice formation or loosen accumulated ice), and pneumatic deicing (using inflatable elements to expand the profile of an aircraft structure to crack accumulated ice).

Some state of the art pneumatic deicers (sometimes called deicer boots) employ a neoprene or polyester urethane outer layer positioned over a natural rubber inner layer, which is connected to an aircraft flight surface. Inflation tubes are positioned between the inner layer and the aircraft structure. The inflation tubes inflate causing portions of the outer and inner layers to move away from the aircraft first surface. This movement deforms the outer layer so that ice that has accumulated on the outer layer cracks and is shed from the outer layer.

The inflation tubes typically require bleed air from the aircraft engine to inflate the boot. Apart from engine performance impact, such systems can require a complex control valve mechanism to bring the air as usable source.

BRIEF DESCRIPTION

Disclosed is an aircraft flight surface deicing system that includes an electromagnetic field generator and a deicing boot configured for attachment to an aircraft flight surface. The boot includes: one or more inflation regions including a first inflation region; one or more magnetic fluid reservoirs in fluid communication with the first inflation region, the one or more fluid reservoirs including a first fluid reservoir; a magnetic fluid contained in a combination of the first inflation regions and the one or more magnetic fluid reservoirs. In a first state, the magnetic fluid is contained in the first fluid reservoir and, in a deicing state, the electromagnetic field generator generates one or more fields that cause the magnetic fluid to exit the first fluid reservoir and travels along a length of the inflation region.

According to one embodiment, in the system of any prior disclosed embodiment, the movement along the length of the inflation region causes ice located over the first inflation to be broken.

According to one embodiment, in the system of any prior disclosed embodiment, the deicing boot is arranged on a wing of an aircraft.

According to one embodiment, in the system of any prior disclosed embodiment, the length of the inflation region is arranged along a span wise direction of the wing.

According to one embodiment, in the system of any prior disclosed embodiment, the one or more fluid reservoirs include a second fluid reservoir.

According to one embodiment, in the system of any prior disclosed embodiment, the magnetic fluid moves from the first fluid reservoir to the second fluid reservoir when the system is in the deicing state.

According to one embodiment, in the system of any prior disclosed embodiment, when the system is in the deicing state, the magnetic field generator generates a first magnetic field that repulses the magnetic fluid out of the first fluid reservoir and the second magnetic field that attracts the magnetic fluid into the second fluid reservoir.

According to one embodiment, in the system of any prior disclosed embodiment, the magnetic field generator is located in the wing.

According to one embodiment, in the system of any prior disclosed embodiment, the one or more fluid reservoirs include a second fluid reservoir.

According to one embodiment, in the system of any prior disclosed embodiment, the magnetic fluid moves from the first fluid reservoir to the second fluid reservoir when the system is in the deicing state.

According to one embodiment, in the system of any prior disclosed embodiment, when the system is in the deicing state, the magnetic field generator generates a first magnetic field that repulses the magnetic fluid out of the first fluid reservoir and the second magnetic field that attracts the magnetic fluid into the second fluid reservoir.

According to one embodiment, in the system of any prior disclosed embodiment, the magnetic field generator is located in the aircraft flight surface.

According to one embodiment, in the system of any prior disclosed embodiment, the magnetic fluid include magnetic nanoparticles contained therein.

Also disclosed is a method deicing an aircraft flight surface system. The method includes: attaching a deicing boot to an aircraft flight surface, the boot including one or more inflation regions including a first inflation region, one or more magnetic fluid reservoirs in fluid communication with the first inflation region, the one or more fluid reservoirs including a first fluid reservoir, and a magnetic fluid contained in a combination of the first inflation regions and the one or more magnetic fluid reservoirs; providing a magnetic field with an electromagnetic field generator such that in a first state, the magnetic fluid is contained in the first fluid reservoir and, in a deicing state, the electromagnetic field generator generates one or more fields that cause the magnetic fluid to exit the first fluid reservoir and travel along a length of the inflation region.

According to one embodiment, in the method of any prior disclosed embodiment, the deicing boot is attached to a wing of an aircraft.

According to one embodiment, in the method of any prior disclosed embodiment, the length of the inflation region is arranged along a span wise direction of the wing.

According to one embodiment, in the method of any prior disclosed embodiment, the one or more fluid reservoirs include a second fluid reservoir and wherein the magnetic fluid moves from the first fluid reservoir to the second fluid reservoir when the system is in the deicing state.

According to one embodiment, in the method of any prior disclosed embodiment, when the system is in the deicing state, the magnetic field generator generates a first magnetic field that repulses the magnetic fluid out of the first fluid reservoir and the second magnetic field that attracts the magnetic fluid into the second fluid reservoir.

According to one embodiment, in any prior disclosed method, the method also includes locating the magnetic field generator in the wing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
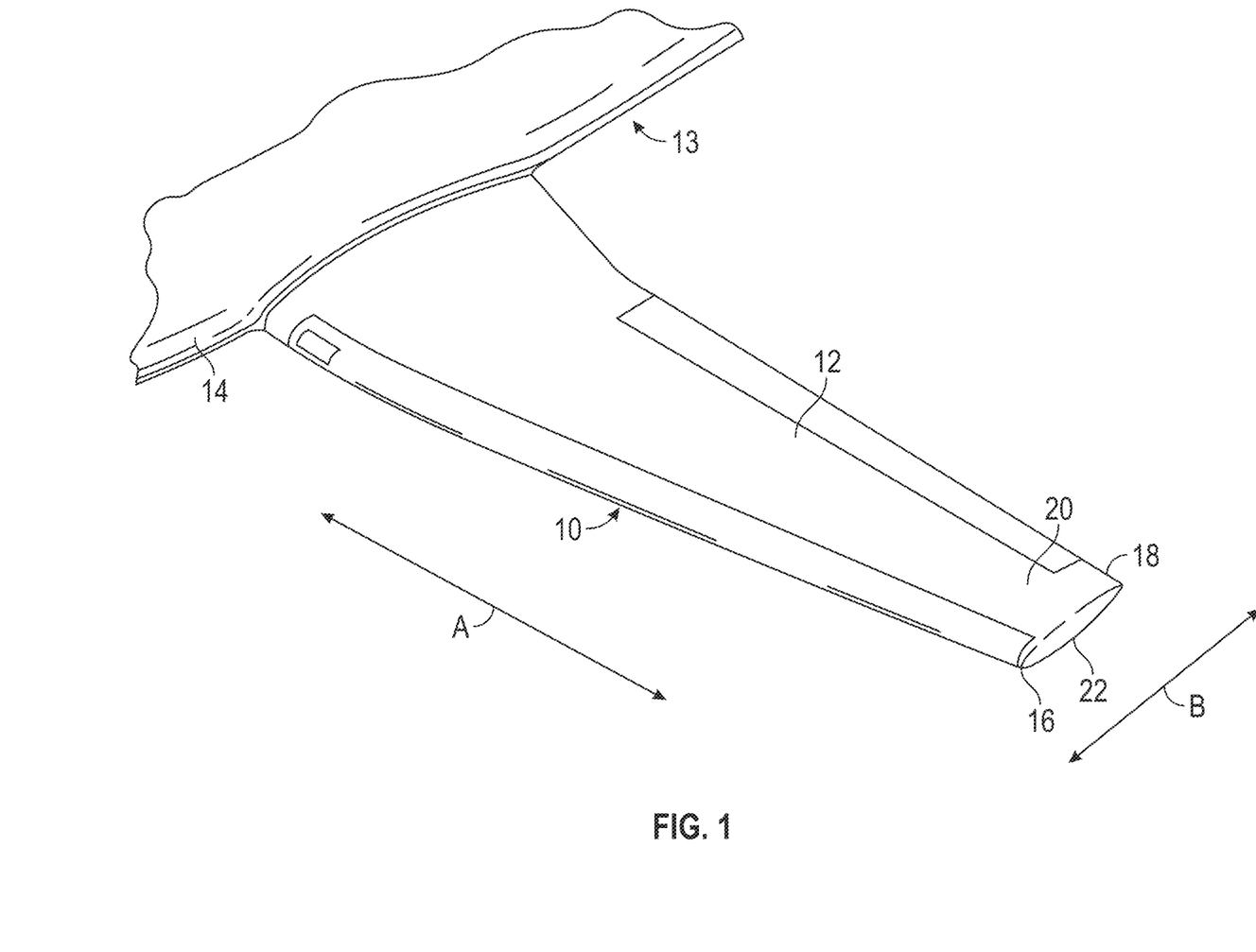
FIG. 1 is a partial view of aircraft including a deicing boot.

As shown in FIG. 1 a deicer boot or pad 10 is mounted on the leading edge of a wing 12 of an aircraft 13, only partial shown. The wing 12 is attached to the fuselage 14 of the aircraft 13. Although the invention is described with respect to a wing 12, it is equally applicable to a tail section or an airfoil of an aircraft. Any of these portions of an aircraft can generally be referred to as a flight surface herein.

The wing 12 can extend in a span wise direction away from the fuselage 14 as generally indicated by arrow A. The wing 12 extends from a leading edge 16 to a trailing edge 18 in a chord wise direction generally shown by arrow B. The boot 10 is typically attached to a leading edge 16 and extends along a portion of the wing 12 from the leading edge 10 toward the trailing edge 18 along one or both of the upper 20 and lower 22 surfaces of the wing 12.

Figure 2:
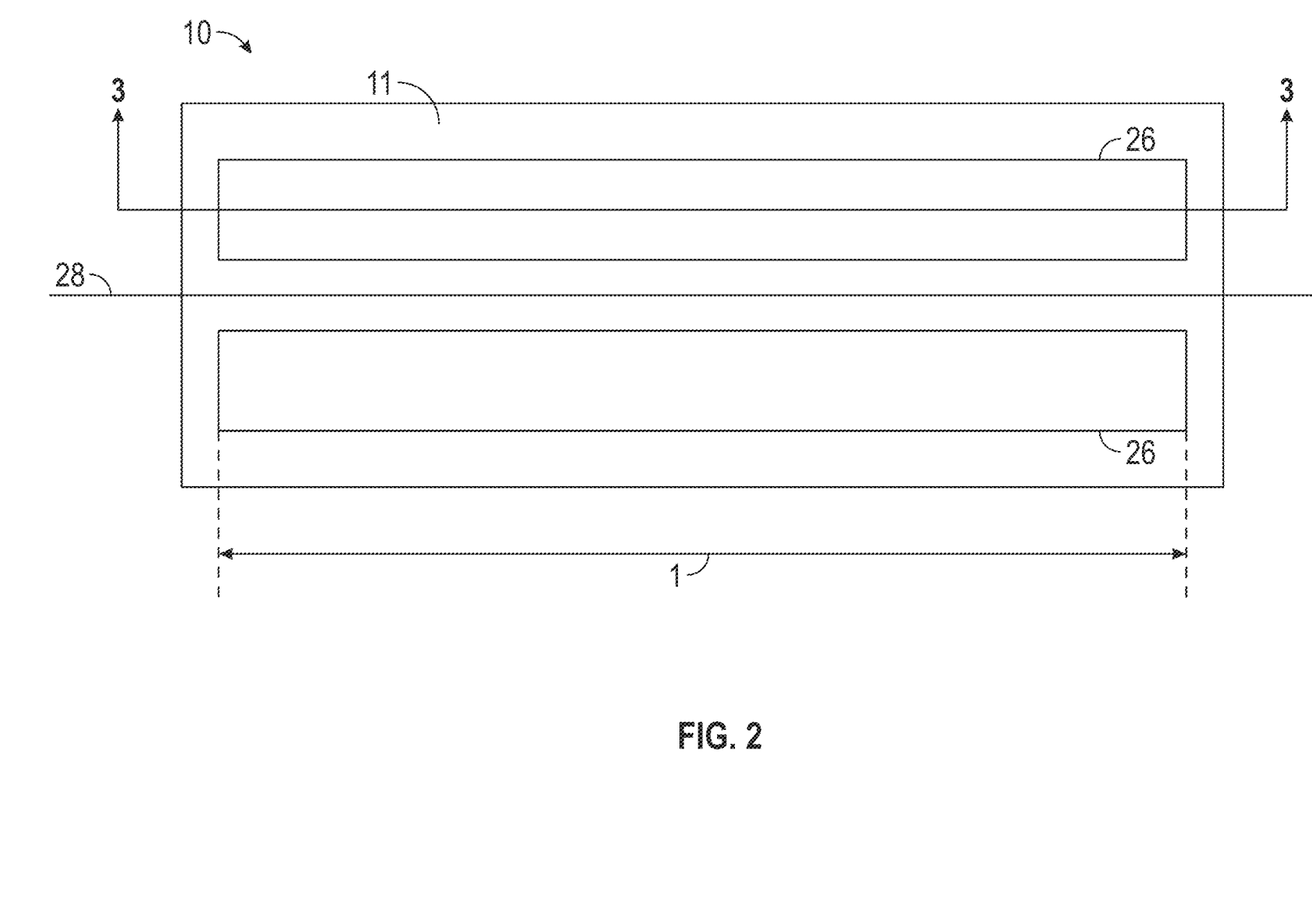
FIG. 2 is a plan view of a deicing boot according to one embodiment.

As shown in FIG. 2, the deicer boot 10 is a generally rectangular structure having a base layer 11 with one or more inflation regions 26 formed thereon. The inflation regions have a length (1).

The inflation regions 26 are flat in a normal operating mode as shown in FIG. 2. The inflation regions 26 can be formed, for example, by woven textile fabric which is suitably coated with a suitable rubber compound to make the inflation region 26 air impervious. The inside of the inflation regions 26, as described below, will have a magnetic liquid or gel that can travel there through. In one embodiment, the liquid or gel includes magnetic particles (or nanoparticles) disposed therein and will generally be referred to herein as a magnetic fluid. In a deicing mode, an electromagnetic force can be applied such that the magnetic fluid moves along the inflation region 26. In one embodiment, this movement causes a local "inflation" of the inflation region 26 (see local region 27 below) that serves to break ice formed on a surface of the boot 10.

With reference to FIGS. 1 and 2, as shown, the boot 10 includes a stagnation line 28 that is the line along which the air separates above and below the wing 10 and in the example is generally parallel to the leading edge 16 of the wing. That is, the stagnation line 28 and the inflation regions 26 can extend along the wing 12 in the span wise direction A.

The number of inflation regions 26 can vary and can include at least one but most likely at least two, one above the stagnation line 28 and one below. Further, there can be different numbers of inflations regions 26 above the stagnation line 28 than below it. For example, there can be from 1 to 10 regions 26 above the stagnation line 28 and from 1 to 10 below it in any combination.

Figure 3A:
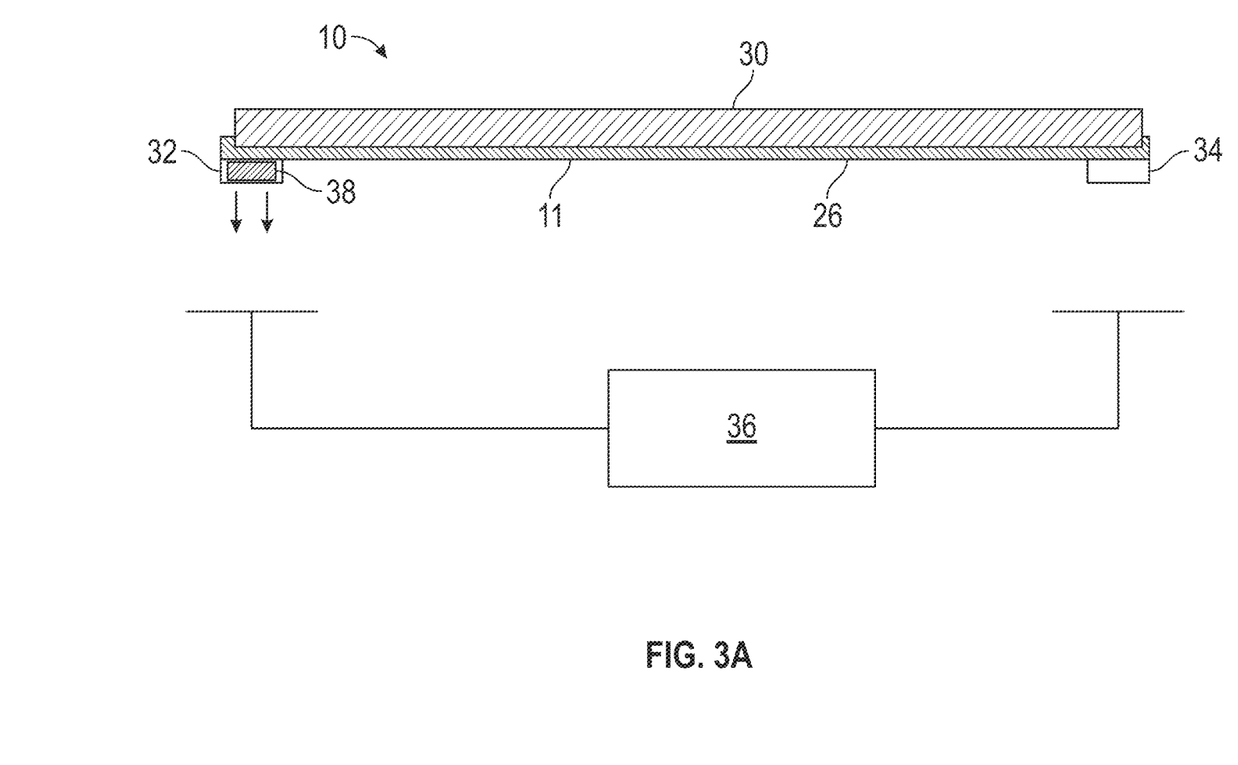
FIGS. 3A-3D shows a cross-section of the boot of FIG. 2 as a magnetic fluid moves along a length of an inflation of the boot according to one embodiment.

FIGS. 3A-3D show a cross section of the inflation 26 in FIG. 2 taken along line 3-3. As illustrated the inflation region 26 is connected to first and second fluid reservoirs 32, 34 that hold the magnetic fluid 38 and are in fluid communication with the inflation region 26 such that a fluid in the reservoirs 32, 34 can enter the inflation region 26 and vice versa. In FIG. 3A, the magnetic fluid 38 is in the first reservoir 32. The skilled artisan will realize that embodiments can include a single reservoir or no reservoir at all. An example with only reservoir is described with respect to FIGS. 4A-4C.

As shown in FIG. 3A, the inflation region 26 is in a normal or uninflated state/mode. In such a state, an electromagnetic force generator 36 is generating a force generally shown by the downward facing force arrows extending from the first reservoir 32. This force causes the magnetic fluid 38 to remain in the first reservoir 32. The generator 36 can be any type of generator that can generate the magnetic fluid in one or more regions that can attract or repulse the magnetic fluid 38. The magnetic field generator 36 can be fixed or movable within flight surface. The generator 36 can be located within the flight surface to which the boot 10 is attached in one embodiment.

For this explanation, it is assumed that while the magnetic fluid 38 is in the first reservoir 32 as shown in FIG. 3A, a layer of ice 30 has formed over the inflation region 26.

Figure 3B:
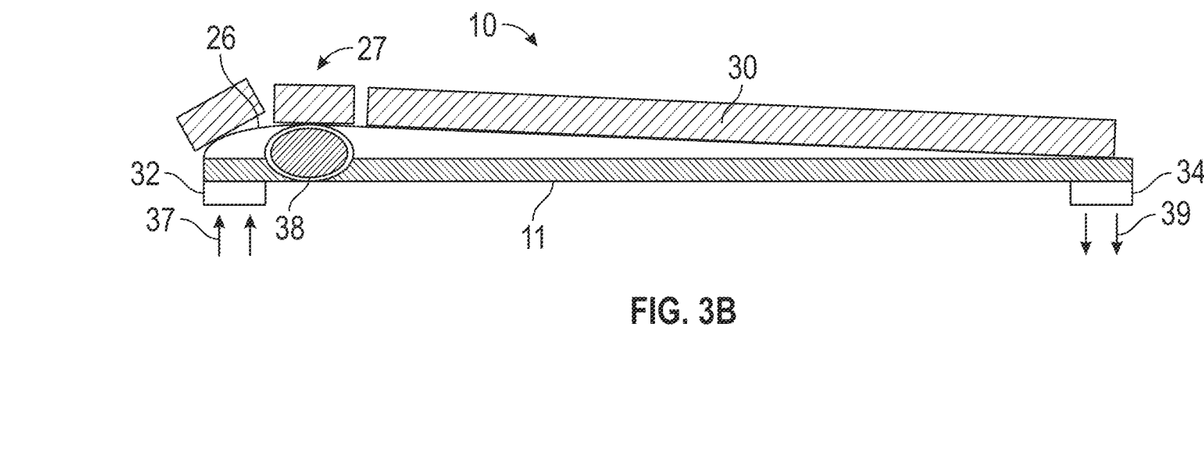
Figure 3C:
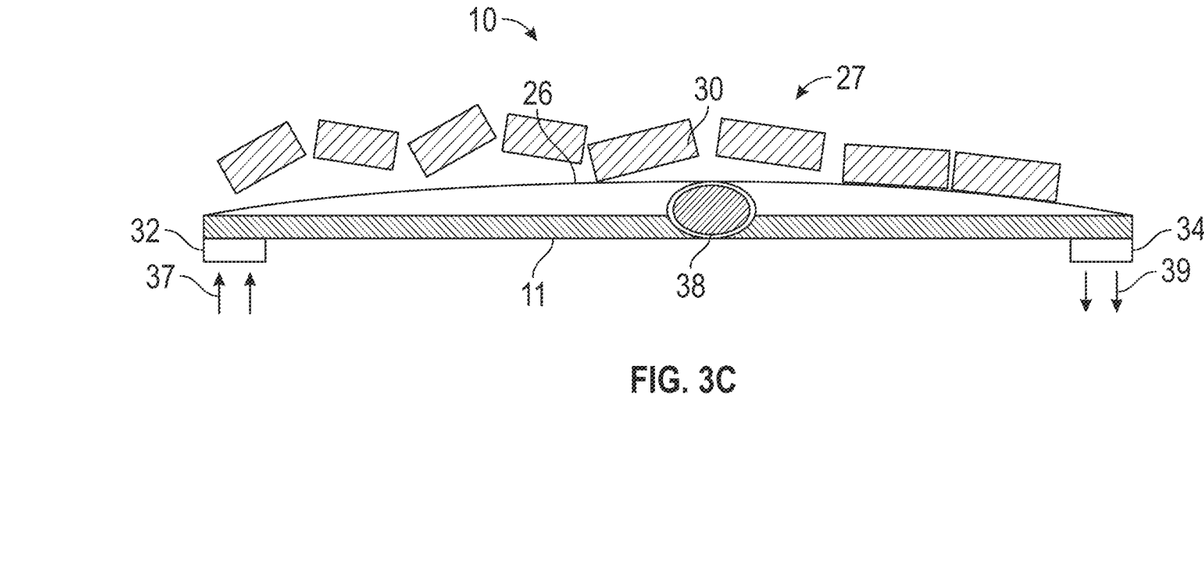

Either by determining that ice is on the inflation region 26 or based on a user input causing the boot 10 to transition into a deicing state, the electromagnetic generator 36 generates forces generally shown by force arrows 37 and 39 as shown in FIG. 3B. The force arrows 37 generally repulse the magnetic fluid 38 out of the first reservoir 32 to inflate the inflation region 26 in a local region 27. The force arrow 39 generally attract the magnetic fluid 38 towards the second reservoir 34. Movement along the length of the inflation region, as illustrated, breaks the ice.

The force arrows 37, 39 can be applied to continue moving the magnetic fluid 38 (and thus local region 27) away from the first reservoir 32 towards the second reservoir 34 along a length of the inflation region 26. This is shown, for example, in FIG. 3C where the magnetic fluid 38 has moved closer to the second reservoir 34. This serves to continue breaking the ice layer 30.

Figure 3D:
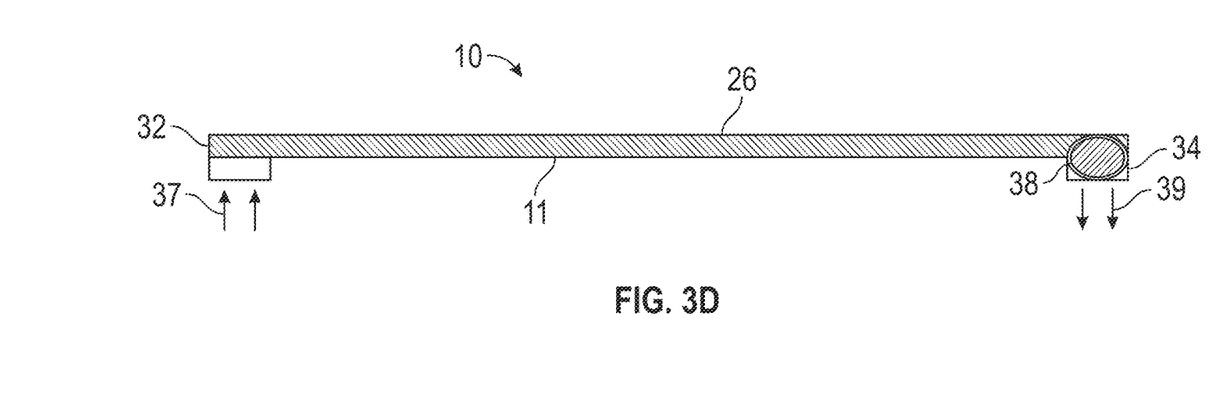

As shown in FIG. 3D, the magnetic fluid 38 eventually collects in the second reservoir 34 and remains there due to force arrows 39. The skilled artisan will realize that if desired, the magnetic fluid 38 can be returned by reversing the direction of the force lines 37/39.

Figure 4A:
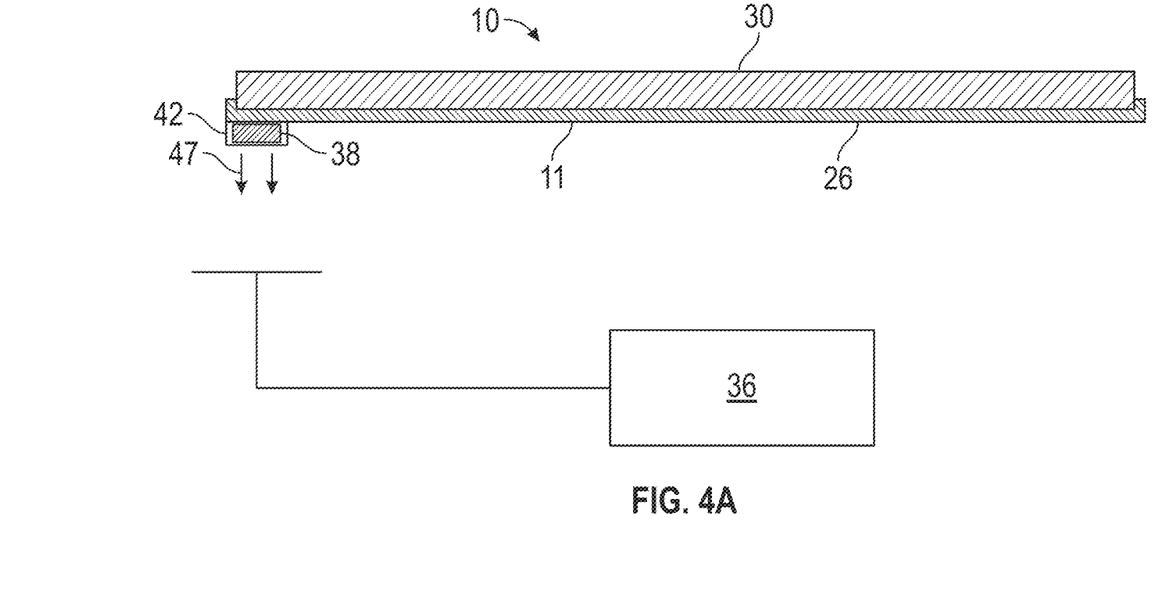
FIGS. 4A-4C shows a cross-section of the boot of FIG. 2 as a magnetic fluid moves along a length of an inflation of the boot according to another embodiment.
Figure 4B:
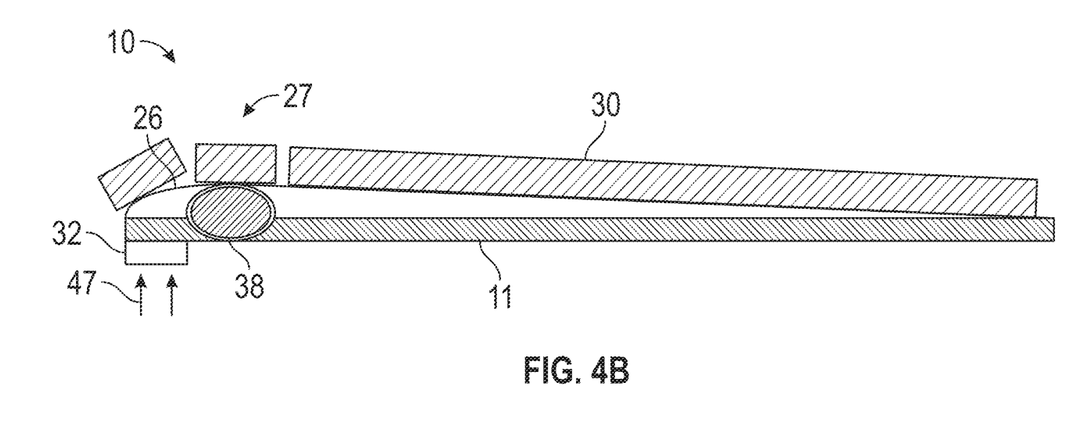
Figure 4C:
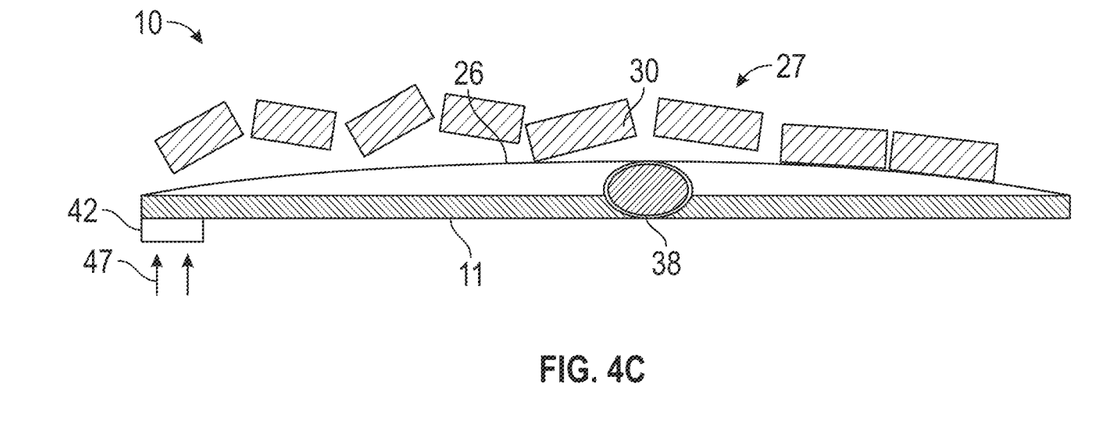

FIGS. 4A-4C also show a cross section of the other inflation 26 in FIG. 2 taken along line 3-3 according to another embodiment. In this embodiment, the inflation region 26 is connected to only a first 42 reservoir (as opposed to the two of FIGS. 3A-3D) that hold the magnetic fluid 38. In FIG. 4A, the magnetic fluid 38 is in the first reservoir 42.

As shown in FIG. 4A, the inflation region 26 is in a normal or uninflated state/mode. In such a state, an electromagnetic force generator 36 is generating a force generally shown by the downward facing force arrows 47 extending from the first reservoir 42. This force causes the magnetic fluid 38 to remain in the first reservoir 42.

Either by determining that ice is on the inflation region 26 or based on a user input causing the boot 10 to transition into a deicing state, the electromagnetic generator 36 generates forces reverses the direction of the force arrows 47 as shown in FIGS. 4B/4C. The force arrows 47 generally repulse the magnetic fluid 38 out of the first reservoir 32 to inflate the inflation region 26 in a local region are generally reference by reference numeral 27. The force arrow 39 generally attract the magnetic fluid 38 towards the second reservoir 34. In this embodiment, the direction of the force arrows 47 can be reversed to move the magnetic liquid 38 around in the inflation region 26 as desired.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft flight surface deicing system comprising:
    an electromagnetic field generator; and
    a deicing boot configured for attachment to an aircraft flight surface, the boot including:
        one or more inflation regions including a first inflation region;
        one or more magnetic fluid reservoirs in fluid communication with the first inflation region, the one or more fluid reservoirs including a first fluid reservoir; and
        a magnetic fluid contained in a combination of the first inflation regions and the one or more magnetic fluid reservoirs;
        wherein, in a first state, the magnetic fluid is contained in the first fluid reservoir and, in a deicing state, the electromagnetic field generator generates one or more fields that cause the magnetic fluid to exit the first fluid reservoir and travel along a length of the first inflation region.

2. The system of claim 1, wherein the movement along the length of the inflation region causes ice located over the first inflation to be broken.

3. An aircraft comprising:
    a wing; and
    the system of claim 1;
    wherein the deicing boot is arranged on the wing.

4. The aircraft of claim 3, wherein the length of the inflation region is arranged along a span wise direction of the wing.

5. The aircraft of claim 3, wherein the one or more fluid reservoirs include a second fluid reservoir.

6. The aircraft of claim 3, wherein the magnetic fluid moves from the first fluid reservoir to the second fluid reservoir when the system is in the deicing state.

7. The aircraft of claim 3, wherein when the system is in the deicing state, the electromagnetic field generator generates a first magnetic field that repulses the magnetic fluid out of the first fluid reservoir and the second magnetic field that attracts the magnetic fluid into the second fluid reservoir.

8. The aircraft of claim 7, wherein the electromagnetic field generator is located in the wing.

9. The system of claim 1, wherein the one or more fluid reservoirs include a second fluid reservoir.

10. The system of claim 9, wherein the magnetic fluid moves from the first fluid reservoir to the second fluid reservoir when the system is in the deicing state.

11. The system of claim 10, wherein when the system is in the deicing state, the electromagnetic field generator generates a first magnetic field that repulses the magnetic fluid out of the first fluid reservoir and a second magnetic field that attracts the magnetic fluid into the second fluid reservoir.

12. The system of claim 11, wherein the electromagnetic field generator is configured to be located in the aircraft flight surface.

13. The system of claim 1, wherein the magnetic fluid includes magnetic nanoparticles contained therein.

14. A method of deicing an aircraft flight surface system comprising:
    attaching a deicing boot to an aircraft flight surface, the boot including one or more inflation regions including a first inflation region, one or more magnetic fluid reservoirs in fluid communication with the first inflation region, the one or more fluid reservoirs including a first fluid reservoir, and a magnetic fluid contained in a combination of the first inflation regions and the one or more magnetic fluid reservoirs; and
    providing a magnetic field with an electromagnetic field generator such that in a first state, the magnetic fluid is contained in the first fluid reservoir and, in a deicing state, the electromagnetic field generator generates one or more fields that cause the magnetic fluid to exit the first fluid reservoir and travel along a length of the first inflation region.

15. The method of claim 14, wherein the aircraft flight surface is a wing and attaching includes arranging the length of the first inflation region along a span wise direction of the wing.

16. The method of claim 15, wherein the one or more fluid reservoirs include a second fluid reservoir and wherein the magnetic fluid moves from the first fluid reservoir to the second fluid reservoir when the system is in the deicing state.

17. The method of claim 16, wherein when the system is in the deicing state, the electromagnetic field generator generates a first magnetic field that repulses the magnetic fluid out of the first fluid reservoir and a second magnetic field that attracts the magnetic fluid into the second fluid reservoir.

18. The method of claim 17, further comprising, locating the electromagnetic field generator in the wing.

* * * * *